(12) United States Patent
Daigger et al.

(10) Patent No.: US 8,721,887 B2
(45) Date of Patent: May 13, 2014

(54) METHOD AND SYSTEM FOR TREATING WASTEWATER

(75) Inventors: Glen T. Daigger, Englewood, CO (US); Julian Sandino, Overland Park, KS (US); Steven J. Goodwin, Fuquay Varina, NC (US)

(73) Assignee: CH2M Hill, Inc., Englewood, CO (US)

( * ) Notice: Subject to any disclaimer, the term of this patent is extended or adjusted under 35 U.S.C. 154(b) by 519 days.

(21) Appl. No.: 12/962,348

(22) Filed: Dec. 7, 2010

(65) Prior Publication Data

US 2011/0132837 A1 Jun. 9, 2011

Related U.S. Application Data

(60) Provisional application No. 61/267,281, filed on Dec. 7, 2009.

(51) Int. Cl.
*C02F 3/30* (2006.01)

(52) U.S. Cl.
USPC .......... 210/605; 210/622; 210/623; 210/259; 210/903; 210/916

(58) Field of Classification Search
USPC ......... 210/605, 622, 623, 252, 259, 903, 906, 210/916
See application file for complete search history.

(56) References Cited

U.S. PATENT DOCUMENTS

| | | | |
|---|---|---|---|
| 3,763,038 A | 10/1973 | Misaka et al. | |
| 3,764,524 A | 10/1973 | Stankewich, Jr. | |
| 3,994,802 A | 11/1976 | Casey et al. | |
| 4,008,161 A | 2/1977 | Wong et al. | |
| 4,021,347 A | 5/1977 | Teller et al. | |
| 4,029,575 A | 6/1977 | Bykowski et al. | |
| 4,042,493 A | 8/1977 | Matsch et al. | |
| 4,081,365 A | 3/1978 | White et al. | |
| 4,160,724 A | 7/1979 | Laughton | |

(Continued)

FOREIGN PATENT DOCUMENTS

| | | |
|---|---|---|
| CA | 2314383 | 1/2002 |
| JP | 59-98800 | 6/1984 |

(Continued)

OTHER PUBLICATIONS

Crawford et al., "Membrane Bioreactors—A Designer's Perspective", Proceedings of the 29th WEAO Conference and Technical Symposium Hamilton, Ontario, 2000, 12 pages.

(Continued)

*Primary Examiner* — Fred Prince
(74) *Attorney, Agent, or Firm* — Dorsey & Whitney LLP

(57) ABSTRACT

Methods and systems for utilizing biological wastewater treatment processes to remove nutrients from wastewater containing reduced sulfide compounds may include treating the wastewater in an anaerobic zone, an anoxic zone, and an aerobic zone. The wastewater is first treated in the anaerobic zone to uptake residual biodegradable organic material using specialized bacteria known as phosphorus accumulating organisms ("PAOs") and glycogen accumulating organisms ("GAOs"). After treatment in the anaerobic zone, the wastewater is treated in an anoxic zone to convert nitrates to nitrogen gas and sulfur to sulfates. Following treatment in the anoxic zone, the wastewater is treated in the aerobic zone to oxidize ammonia to nitrate and to complete removal of phosphorus. After treatment in the aerobic zone, the wastewater may be treated in other zones, or may be delivered to a liquid-solids treatment stage.

14 Claims, 1 Drawing Sheet

(56) References Cited

U.S. PATENT DOCUMENTS

| | | |
|---|---|---|
| 4,167,479 A | 9/1979 | Besik |
| 4,183,809 A | 1/1980 | Klapwijk et al. |
| 4,207,397 A | 6/1980 | Davis et al. |
| 4,209,396 A | 6/1980 | White et al. |
| 4,237,002 A | 12/1980 | Strudgeon et al. |
| 4,315,821 A | 2/1982 | Climenhage |
| 4,416,779 A | 11/1983 | Ripl et al. |
| 4,488,968 A | 12/1984 | Hong et al. |
| 4,566,986 A | 1/1986 | Waldmann |
| 4,623,464 A | 11/1986 | Ying et al. |
| 4,643,830 A * | 2/1987 | Reid ........................... 210/629 |
| RE32,429 E | 6/1987 | Spector |
| 4,721,569 A | 1/1988 | Northrop |
| 4,724,085 A | 2/1988 | Pohoreski |
| 4,780,208 A | 10/1988 | Böhnke et al. |
| 4,787,978 A | 11/1988 | Nicol |
| 4,867,883 A | 9/1989 | Daigger et al. |
| 4,882,058 A | 11/1989 | Burton |
| 4,904,387 A | 2/1990 | Jordan |
| 4,961,854 A | 10/1990 | Wittman et al. |
| 4,999,111 A | 3/1991 | Williamson |
| 5,022,993 A | 6/1991 | Williamson |
| 5,043,072 A | 8/1991 | Hitotsuyanagi et al. |
| 5,098,567 A | 3/1992 | Nishiguchi |
| 5,128,040 A | 7/1992 | Molof et al. |
| 5,160,043 A | 11/1992 | Kos |
| 5,182,021 A | 1/1993 | Spector |
| 5,240,611 A | 8/1993 | Burton |
| 5,258,121 A | 11/1993 | Jordan et al. |
| 5,288,405 A | 2/1994 | Lamb, III |
| 5,290,451 A | 3/1994 | Koster et al. |
| 5,342,522 A | 8/1994 | Marsman et al. |
| 5,354,471 A | 10/1994 | Timpany et al. |
| 5,364,534 A | 11/1994 | Anselme et al. |
| 5,380,438 A | 1/1995 | Nungesser |
| 5,443,845 A | 8/1995 | Felix |
| 5,472,472 A | 12/1995 | Northrop |
| 5,480,548 A | 1/1996 | Daigger et al. |
| 5,514,278 A | 5/1996 | Khudenko |
| 5,593,592 A | 1/1997 | Kagawa et al. |
| 5,601,719 A | 2/1997 | Hawkins et al. |
| 5,603,833 A | 2/1997 | Miller |
| 5,643,453 A | 7/1997 | Pannier et al. |
| 5,650,069 A | 7/1997 | Hong et al. |
| 5,651,889 A | 7/1997 | Wataya et al. |
| 5,651,891 A | 7/1997 | Molof et al. |
| 5,651,892 A | 7/1997 | Pollock |
| 5,725,885 A | 3/1998 | Felix et al. |
| 5,733,455 A | 3/1998 | Molof et al. |
| 5,733,456 A | 3/1998 | Okey et al. |
| 5,759,401 A | 6/1998 | Boussely et al. |
| 5,783,083 A | 7/1998 | Henshaw |
| 5,792,355 A | 8/1998 | Desjardins |
| 5,798,044 A | 8/1998 | Strohmeier et al. |
| 5,853,588 A | 12/1998 | Molof |
| 5,853,589 A | 12/1998 | Desjardins et al. |
| 5,855,793 A | 1/1999 | Ikeda et al. |
| 5,890,454 A | 4/1999 | Moore, Jr. |
| 5,942,108 A | 8/1999 | Yang |
| 6,007,712 A | 12/1999 | Tanaka et al. |
| 6,027,649 A | 2/2000 | Benedek et al. |
| 6,045,707 A | 4/2000 | Scrudato et al. |
| 6,077,430 A | 6/2000 | Chudoba et al. |
| 6,113,788 A | 9/2000 | Molof et al. |
| 6,174,442 B1 | 1/2001 | Geisser et al. |
| 6,217,768 B1 | 4/2001 | Hansen et al. |
| 6,221,652 B1 * | 4/2001 | Janssen et al. ................ 435/266 |
| 6,312,599 B1 | 11/2001 | Reid |
| 6,322,701 B1 | 11/2001 | Delighiannis |
| 6,338,799 B1 | 1/2002 | Fukushima et al. |
| 6,375,848 B1 | 4/2002 | Cote et al. |
| 6,406,628 B1 | 6/2002 | Chang et al. |
| 6,406,629 B1 | 6/2002 | Husain et al. |
| 6,447,687 B1 | 9/2002 | Winn |
| 6,485,645 B1 | 11/2002 | Husain et al. |
| 6,517,723 B1 | 2/2003 | Daigger et al. |
| 6,551,815 B1 | 4/2003 | Nuttall et al. |
| 6,572,771 B2 | 6/2003 | Yamasaki et al. |
| 6,706,185 B2 | 3/2004 | Goel et al. |
| 6,733,662 B2 | 5/2004 | Pollock |
| 6,758,972 B2 | 7/2004 | Vriens et al. |
| 6,808,629 B2 | 10/2004 | Wousters-Wasiak et al. |
| 6,863,818 B2 | 3/2005 | Daigger et al. |
| 6,893,567 B1 | 5/2005 | Vanotti et al. |
| 6,946,073 B2 | 9/2005 | Daigger et al. |
| 7,147,776 B2 * | 12/2006 | Krier ............................ 210/605 |
| 7,510,655 B2 * | 3/2009 | Barnes ......................... 210/605 |
| 7,927,493 B2 | 4/2011 | Daigger |
| 2002/0162795 A1 | 11/2002 | Pollock |
| 2002/0185435 A1 * | 12/2002 | Husain et al. ................. 210/605 |
| 2003/0217968 A1 | 11/2003 | Goel et al. |
| 2005/0045557 A1 * | 3/2005 | Daigger et al. ............... 210/605 |
| 2005/0252854 A1 * | 11/2005 | Krier ............................ 210/605 |
| 2007/0163952 A1 * | 7/2007 | Schreier et al. .............. 210/605 |

FOREIGN PATENT DOCUMENTS

| | | |
|---|---|---|
| JP | 60-38095 | 2/1985 |
| JP | 4-215892 | 8/1992 |
| JP | 11-262795 | 9/1999 |
| JP | 200016755 | 6/2000 |

OTHER PUBLICATIONS

Kayser et al., "Operational Results of the Wolfsburg Wastewater Treatment Plant", Wat. Sci. Tech., vol. 25, No. 4-5, 1992, pp. 203-209.

Lebeau et al., "Application of Immersed Membrane Microfiltration for NOM Removal", Paper presented at AWWA Annual Conference & Exhibition Dallas, Texas, Jun. 21-25, 1998, pp. 497-512.

* cited by examiner

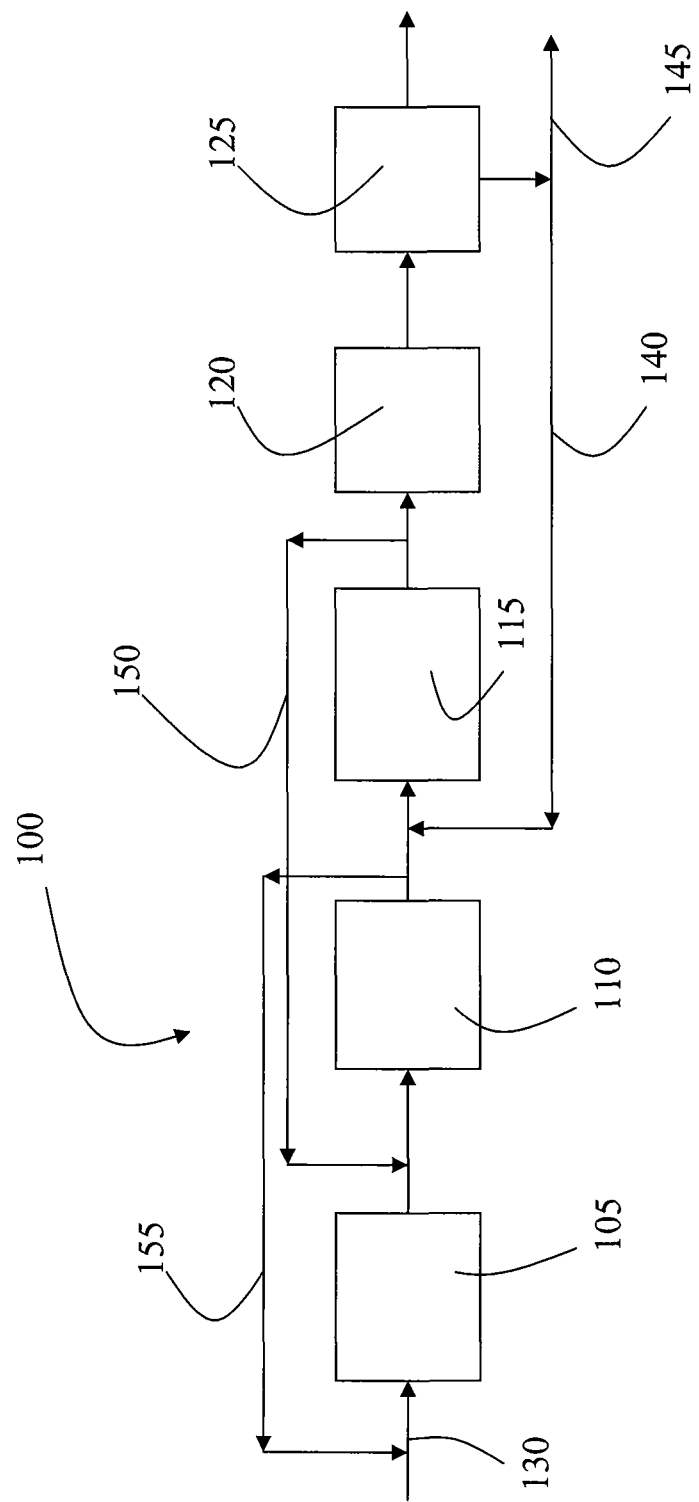

METHOD AND SYSTEM FOR TREATING WASTEWATER

CROSS-REFERENCE TO RELATED APPLICATIONS

This application claims the benefit, under 35 U.S.C. §119 (e), of U.S. provisional application No. 61/267,281, entitled "Method and System for Treating Wastewater" and filed on Dec. 7, 2009, which is hereby incorporated herein by reference in its entirety.

FIELD OF INVENTION

The present invention generally relates to water treatment, and more particularly to methods and systems for biologically treating wastewater that contains significant concentrations of hydrogen sulfide.

BACKGROUND

Aerobic single sludge suspended growth biological wastewater treatment processes (often called activated sludge processes) are widely used to treat wastewaters that contain biodegradable organic matter, nitrogen and phosphorus. When configured with anaerobic and anoxic zones and appropriate in-process recirculation streams, these processes are capable of achieving significant nitrogen and/or phosphorus removal. Such configurations are typically referred to as biological nutrient removal processes. Conventional biological nutrient removal processes use heterotrophic bacteria for biological phosphorus removal and denitrification (conversion of nitrate to nitrogen gas), and autotrophic bacteria for nitrification (conversion of ammonia to nitrate).

Heterotrophic bacteria require biodegradable organic matter, which is often quantified as five-day biochemical oxygen demand ("$BOD_5$") or biodegradable chemical oxygen demand ("bCOD"). Consequently, sufficient biodegradable organic matter must be present in wastewater treated by these biological nutrient removal processes for effective removal of nitrogen and phosphorus. In general, 5 mg of $BOD_5$ or more is needed to remove 1 mg of nitrogen, expressed as the total Kjeldahl nitrogen, or TKN, and 7 to 10 mg of volatile fatty acids ("VFAs"), such as acetic or propionic acid, must be present in the wastewater or generated in the anaerobic zone of the process to remove 1 mg of phosphorus, expressed as P. Biological nutrient removal is adversely affected for wastewaters containing insufficient quantities of biodegradable organic matter relative to the nutrients contained within the wastewater.

Some wastewaters are not only deficient in biodegradable organic matter relative to the nutrients to be removed but also contain reduced sulfur compounds, often in the form of hydrogen sulfide ($H_2S$). Such wastewaters are often generated when municipal and industrial wastewaters are pre-treated with methanogenic anaerobic processes. Methanogenic anaerobic treatment of wastewater containing biodegradable organic matter generally requires significantly less energy input compared to the amount required for aerobic treatment of such wastewaters and, in fact, energy is produced in the form of methane-containing biogas. Biomass yields are also lower in these types of anaerobic processes, resulting in less residual sludge to be processed.

However, the effluent from a methanogenic anaerobic process contains most of the nutrients originally in the wastewater. Further, significant quantities of $H_2S$ and other reduced sulfur compounds can be generated during the process. Thus, the resulting wastewater often cannot be effectively treated biologically to remove nutrients because of the deficit of biodegradable organic matter. Moreover, biodegradable carbon in the form of compounds such as methanol, acetic acid, or a variety of other readily available biodegradable organic matter products must be purchased and added to the process to remove nutrients. This, of course, seems to be counterproductive as biodegradable carbon is first removed from the wastewater and then subsequently purchased and added back into it. Moreover, the reduced sulfur compounds generated during the anaerobic treatment process pass into the aerobic zone of the biological nutrient removal process, where these compounds exert a significant oxygen demand of 2 mg $O_2$/mg $H_2S$—S. These two results lead to increased cost and make the option of an anaerobic treatment followed by a conventional biological nutrient removal process unattractive. These results also make it unattractive to use conventional biological removal processes to treat naturally occurring wastewaters, such as certain industrial wastewaters, that have relatively significant concentrations of reduced sulfur compounds and relatively low concentrations of biodegradable matter.

SUMMARY OF THE INVENTION

One embodiment of a method for treating wastewater may include biologically treating the wastewater in an anaerobic zone to reduce biodegradable organic materials contained within the wastewater. The method may further include after treatment in the anaerobic zone, biologically treating the wastewater in an anoxic zone to oxidize reduced sulfur compounds contained within the wastewater. The method may also include after treatment in the anoxic zone, biologically treating the wastewater in an aerobic zone to oxidize ammonia contained within the wastewater and to remove phosphorus contained within the wastewater.

One embodiment of a system for treating wastewater may include an anaerobic zone, an anoxic zone, and an aerobic zone. The anaerobic zone may be configured to biologically remove biodegradable organic materials contained within the wastewater. The anoxic zone may be in fluid communication with the anaerobic zone and downstream of the anaerobic zone. The anoxic zone may be configured to biologically oxidize reduced sulfur compounds. The aerobic zone may be in fluid communication with the anoxic zone and downstream of the anoxic zone. The aerobic zone may be configured to oxidize ammonia contained within the wastewater and to remove phosphorus contained within the wastewater.

BRIEF DESCRIPTION OF THE DRAWINGS

FIG. 1 shows a schematic view of a wastewater treatment system.

DETAILED DESCRIPTION

Described herein are methods and systems for utilizing biological wastewater treatment processes to remove nutrients from wastewater containing reduced sulfide compounds. The methods and systems include treating the wastewater in an anaerobic zone, an anoxic zone, and an aerobic zone. More particularly, the wastewater is first treated in the anaerobic zone to uptake residual biodegradable organic material using specialized bacteria known as phosphorus accumulating organisms ("PAOs") and glycogen accumulating organisms ("GAOs"). After treatment in the anaerobic zone, the wastewater is treated in an anoxic zone to convert nitrates to nitrogen gas and sulfur to sulfates. Following treatment in the anoxic zone, the wastewater is treated in the aerobic zone to oxidize ammonia to nitrate and to complete removal of phosphorus. After treatment in the aerobic zone, the wastewater may be treated in other zones, or may be delivered to a liquid-solids treatment stage.

As used herein, unless used otherwise stated, "anaerobic" shall refer to a condition with limited oxygen and nitrate input, "anoxic" shall refer to a condition with limited oxygen but significant nitrate input, and "aerobic" shall refer to a condition with significant oxygen input.

FIG. 1 shows a schematic view of a wastewater treatment system 100. The wastewater treatment system 100 may include an anaerobic zone 105, an anoxic zone 110, and an aerobic zone 115. The anaerobic zone 105 is followed by the anoxic zone 110, and the anoxic zone 110 is followed by the aerobic zone 115. Mixed liquor from the aerobic zone may flow through other anoxic and aerobic zones 120 to a liquid-solids separation process 125 or may flow directly to the liquid-solids separation process 125. The liquid-solids separation process 125 may be a clarifier or a membrane system. The system 100 may further include recirculation streams to facilitate creating the conditions (i.e., anaerobic, anoxic, and aerobic) in each zone. Although shown schematically as single cells, each zone of the bioreactor may be long, narrow vessels or multiple cells to create plug flow rather than complete mix reactions within each zone.

In operation, the influent 130 flows to the anaerobic zone 105. The anaerobic zone 105 provides for the uptake of residual biodegradable organic matter present in the influent wastewater to reduce the amount of biodegradable organic matter passing into the downstream anoxic zone 110. In the anaerobic zone 105, specialized bacteria known as PAOs and GAOs take up and store biodegradable organic matter. PAOs are also needed to accomplish phosphorus removal, and thus the anaerobic zone 105 allows for the treatment process to accomplish biological phosphorus removal. The reduced sulfur compounds, such as $H_2S$, pass though the anaerobic zone 105 since no electron acceptor is present to oxidize them.

To limit the amount of biodegradable organic matter flowing to the anoxic zone 110, the anaerobic zone 105 is sized to remove the vast majority of any biodegradable organic matter contained in the influent wastewater 130. If the organics consist principally of VFAs, this could be accomplished with an anaerobic zone solids residence time (SRT) of 0.5 to 1 days. If the organics are not principally VFAs, the anaerobic zone SRT might be in the range of 2 or more days.

The wastewater, which may also be referred to as the mixed liquor, then flows to the anoxic zone 110. The mixed liquor received from the anaerobic zone 105 contains the reduced sulfur compounds and a greatly diminished concentration of biodegradable organic matter. Nitrates that are recirculated from the downstream aerobic zone 115 may also be received in the anoxic zone 110. In the anoxic zone 110, autotrophic denitrification (i.e., the oxidation of reduced sulfur compound by nitrates) occurs, resulting in conversion of sulfur to sulfate and nitrate to nitrogen gas. This can occur because the quantity of biodegradable organic matter entering the anoxic zone 110 is minimized and reduced sulfur compounds are present.

Autotrophic denitrification occurs in the anoxic zone 110 through the process of autotrophic denitrifiers oxidizing sulfur compounds and reducing nitrates. To promote autotrophic denitrification, the anoxic zone 110 is sized to allow the autotrophic denitrifiers to grow since the heterotrophic denitrifiers can grow in both the anoxic and the aerobic zones 110, 115 (most heterotrophic denitrifiers can grow aerobically) but this may not be the case for the autotrophic denitrifiers. Thus, for heterotrophic denitrification, it is not necessary to size the anoxic zone 110 for a minimum SRT for the heterotrophic denitrifiers since the autotrophic denitrifiers likely grow more slowly than the heterotrophic denitrifiers. The SRT for the anoxic zone 110 required for the growth of autotrophic denitrifiers is likely to be 3 or more days.

After treatment in the anoxic zone 110, the wastewater flows to the aerobic zone 115. This mixed liquor contains sulfate, ammonia, and organic nitrogen. In the aerobic zone 115, ammonia is oxidized to nitrate by nitrifying bacteria and biological phosphorus removal is also completed. As needed, oxygen is added to the aerobic zone 115. The oxygen may be added using any conventional or otherwise known system for adding oxygen to aerobic zones.

After treatment in the aerobic zone 115, the water may flow to other aerobic or anoxic zones 120 for additional treatment followed by treatment using a liquid-solids separation process 125 or may flow directly to a liquid-solids separation process 125. In the liquid-solids separation process 125, liquid is separated from the solids remaining in the wastewater. The separated liquid, which may also be referred to as the effluent 135, is discharged to the environment or used in other processes. At least some of the solids separated in the liquid-solids separation process, known as the return activated sludge or RAS 140, may be recirculated upstream to one or more of the zones to maintain a desired biomass concentration for the particular zone. The remaining solids separated in the liquid-solids separation process, known as the waste activated sludge or WAS 145, may be further treated or disposed.

While FIG. 1 shows the RAS 140 being recirculated to the aerobic zone 115, other process locations are possible depending on the dissolved oxygen and nitrate content of this recycle stream. These concentrations depend on the nature of any suspended growth bioreactor process zones located between the initial aerobic zone 115 and the liquid-solids separation process 125 and the nature of the liquid-solids separation process 125.

With continued reference to FIG. 1, a portion of mixed liquor treated in the aerobic zone 115 may be recirculated to the anoxic zone 110 to provide nitrate to create anoxic conditions in the anoxic zone 110. Nitrate is generated in the aerobic zone 115 through nitrification (i.e., the conversion of ammonia to nitrate by autotrophic nitrifiers). This is a conventional feature of single sludge suspended growth biological nutrient removal processes. This recycle stream 150 is referred to as the nitrified recycle ("NRCY"). The NRCY recycle 150 is sized to provide to the anoxic zone 110 sufficient nitrate to balance the reduced sulfur compounds contained within the wastewater. More particularly, the recirculation rate may be set to maintain concentrations of nitrates within the anoxic zone 110 at least at 0.7 mg nitrate-N/mg $H_2S$—S.

An additional recirculation stream 155 may be used to transport denitrified mixed liquor from the anoxic zone 110 to the anaerobic zone 105 to provide microorganisms to anaerobic zone 105. This is referred to as the anoxic recycle 155 ("ARCY"). For some processes, the dissolved oxygen and nitrate concentrations in the RAS 140, if sufficiently low, could be sent directly to the anaerobic zone 105.

Process modeling was performed to test this process. The scenario assumed a municipal wastewater with a flow rate of 50 mgd (million gallons per day). The wastewater was subjected to anaerobic pre-treatment. The objective was to produce very low effluent nutrient concentrations. Consequently, the configuration shown in FIG. 1 was used, along with a second anoxic zone located between the aerobic zone 115 and liquid-solids separation process 125. Methanol was added to the second anoxic zone for further denitrification. Membranes were used for liquid-solids separation. The results with and without autotrophic denitrification, summarized in Table 1, demonstrate the estimated benefits of incorporating autotrophic denitrification in an anoxic zone 110 into the process. With reference to Table 1, it is estimated that less methanol and power are required to achieve similar $BOD_5$, COD, TSS and Total Nitrogen, and Total Phosphorus treatment results for a process that incorporates autotrophic denitrification in an anoxic zone positioned between anaerobic and aerobic zones.

TABLE 1

Comparison of Conventional (No Autotrophic Denitrification) with Process Incorporating Autotrophic Denitrification for 50 Million Gallon per Day (mgd) Plant

| Parameter | Raw Influent | Anaerobic Pretreatment Effluent | Conventional (No Autotrophic Denitrification)[1] | Process with Autotrophic Denitrification[1] |
|---|---|---|---|---|
| $BOD_5$ (mg/L) | 116 | 48 | 1.1 | 1.1 |
| COD (mg/L) | 251 | 122 | 16 | 16 |
| TSS (mg/L) | 120 | 34 | 1.0 | 1.0 |
| Total Nitrogen (mg-N/L) | 29 | 28 | 1.2 | 1.2 |
| Total Phosphorus (mg-P/L) | 5 | 5 | 0.2 | 0.2 |
| Methanol (gal/day) | N/A | N/A | 4,800 | 3,000 |
| Power Requirement (Hp) | N/A | N/A | 5,700 | 5,400 |

Notes:
[1] Effluent value following solids separation utilizing membrane bioreactor.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for treating wastewater comprising:
    biologically treating the wastewater in an anaerobic zone with a suspended mixed liquor to reduce biodegradable organic materials contained within the wastewater;
    after treatment in the anaerobic zone, biologically treating the wastewater in an anoxic zone with the suspended mixed liquor to oxidize reduced sulfur compounds contained within the wastewater, wherein the anoxic zone has a solids retention time of at least three days;
    after treatment in the anoxic zone, biologically treating the wastewater in an aerobic zone with the suspended mixed liquor to oxidize ammonia contained within the wastewater and to remove phosphorus contained within the wastewater; and
    circulating at least a portion of the wastewater treated in the aerobic zone to the anoxic zone to maintain a concentration of nitrates within the anoxic zone at least at 0.7 mg nitrate-N/mg $H_2S$—S.

2. The method of claim 1, further comprising promoting the growth of autotrophic denitrifiers in the anoxic zone.

3. The method of claim 1, further comprising circulating at least a portion of the wastewater treated in the anoxic zone to the anaerobic zone to provide microorganisms to the anaerobic zone.

4. The method of claim 1, further comprising removing a significant portion of the biodegradable organic materials within the anaerobic zone prior to treating the wastewater in the anoxic zone.

5. The method of claim 1, further wherein the anaerobic zone has a solids retention time of at least two days.

6. The method of claim 1, further comprising after treatment in the aerobic zone, subjecting wastewater discharged from the aerobic zone to a liquid-solids separation process to separate solids from the wastewater.

7. The method of claim 6, further comprising circulating at least a portion of the solids to the aerobic zone.

8. A system for treating wastewater comprising:
    an anaerobic zone configured to biologically remove, with a suspended mixed liquor, biodegradable organic materials contained within the wastewater;
    an anoxic zone in fluid communication with the anaerobic zone and downstream of the anaerobic zone, the anoxic zone configured to biologically oxidize reduced sulfur compounds with the suspended mixed liquor and the anoxic zone configured to have a solids retention time of at least three days;
    an aerobic zone in fluid communication with the anoxic zone and downstream of the anoxic zone, the aerobic zone configured to utilize the mixed liquor to biologically oxidize ammonia contained within the wastewater and to biologically remove phosphorus contained within the wastewater; and
    the system is configured to circulate at least a portion of the wastewater treated in the aerobic zone to the anoxic zone to maintain a concentration of nitrates within the anoxic zone at least at 0.7 mq nitrate-N/mq $H_2S$—S.

9. The system of claim 8, wherein the anoxic zone is configured to promote growth of autotrophic denitrifiers.

10. The system of claim 8, wherein the system is further configured to circulate at least a portion of the wastewater treated in the anoxic zone to the anaerobic zone to provide microorganisms to the anaerobic zone.

11. The system of claim 8, wherein the anaerobic zone is configured to remove a significant portion of the biodegradable organic materials prior to treating the wastewater in the anoxic zone.

12. The system of claim 8, wherein the anaerobic zone is configured to have a solids retention time of at least two days.

13. The system of claim 8, further comprising a solids-liquid separation process to separate solids from wastewater received from the aerobic zone, the liquid-solids separation process in fluid communication with the aerobic zone and downstream of the aerobic zone.

14. The system of claim 13, wherein the system is configured to circulate at least a portion of the solids to the aerobic zone.

\* \* \* \* \*